United States Patent [19]
Selman

[11] 3,887,643
[45] June 3, 1975

[54] DIENE-LACTAM BLOCK COPOLYMERS
[75] Inventor: Charles M. Selman, Bartlesville, Okla.
[73] Assignee: Phillips Petroleum Company, Bartlesville, Okla.
[22] Filed: Apr. 27, 1973
[21] Appl. No.: 355,002

Related U.S. Application Data
[63] Continuation-in-part of Ser. No. 150,816, June 7, 1971, abandoned.

[52] U.S. Cl........ 260/857 D; 260/78 R; 260/857 G; 260/857 UH; 260/859 R
[51] Int. Cl............................................. C08g 41/04
[58] Field of Search........................ 260/857 D, 859

[56] References Cited
UNITED STATES PATENTS

| | | | |
|---|---|---|---|
| 3,431,227 | 3/1969 | Kastning | 260/859 R |
| 3,481,923 | 12/1969 | Naarmann | 260/857 D |
| 3,607,976 | 9/1971 | Hsieh | 260/859 |
| 3,770,849 | 11/1973 | Matzner | 260/857 D |

Primary Examiner—Paul Lieberman

[57] ABSTRACT

Diene-lactam block polymers are produced from a metal salt of a lactam, a halogen-substituted isocyanate, a lithium-containing polymer and a lactam.

7 Claims, No Drawings

DIENE-LACTAM BLOCK COPOLYMERS

This application is a continuation-in-part of application Serial No. 150,816, filed June 7, 1971 now abandoned.

This invention relates to the preparation of diene-lactam block copolymers.

In one of its more specific aspects, this invention relates to a method of producing diene-lactam block copolymers which possess high green strength, are sulfur vulcanizable, and are generally of the thermoplastic elastomer type so as to exhibit elastic behavior in an uncured condition at about room temperature while becoming thermoplastic at higher temperatures. As a result of such properties, they are useful in the preparation of films, coatings, tubings, containers, and such articles as can be formed by molding while also being compoundable with fillers, dyes and the like of the rubber compounding art.

According to one embodiment of this invention there is provided a method of producing a diene-lactam block copolymer which comprises reacting a metal salt of a lactam (hereinafter referred to as Compound A) with a halogen-substituted isocyanate (hereinafter referred to as Compound B) to produce a first reaction product (hereinafter referred to as Compound C). This first reaction product is then reacted with a lithium-containing polymer (hereinafter referred to as Component D) to produce a second reaction product. This second reaction product is then reacted with a lactam to produce the diene-lactam block polymer.

Suitable metal salts of lactams employable in the formation of the first reaction product will be of the general formula

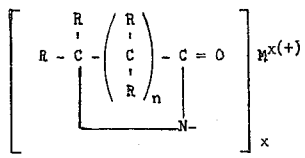

wherein R is selected from the group consisting of hydrogen, alkyl, cycloalkyl and aryl radicals or combinations thereof having from 1 to 10 carbon atoms and wherein the total number of carbon atoms in such substituent groups is not greater than about 12; $n$ is an integer having a value of 1, 2, 4, 5 or 6; $x$ is an integer equal to the valence of M; and M is a metal selected from Group IA or IIA of the Periodic Table of Elements (Handbook of Chemistry and Physics, 46 Ed., Chemical Rubber Co., 1965, pg. B-3).

Examples of suitable metal salts of lactams include the sodium salt of 2-oxohexamethyleneimine, the lithium salt of 2-oxoheptamethyleneimine, the magnesium salt of 2-oxooctamethyleneimine, the calcium salt of 5-methyl-2-oxohexamethyleneimine, the barium salt of 5-ethyl-2-oxohexamethyleneimine, and the magnesium salt of 2-oxohexamethyleneimine. Best results are obtained employing the alkali metal salts.

The metal salts of lactams are prepared by methods known in the art, such as by contacting the lactam with the metal alone, or metal hydride or an organometal compound, all of which metalate the nitrogen atoms of the lactam to form the metal salt. The metal salts are generally prepared in the presence of an inert hydrocarbon diluent. For the purpose of this invention, the metal salts can be employed as dispersions, slurries or solutions in inert hydrocarbon diluents.

The halogen-substituted isocyanate will have the general formula X — R' — NCO wherein X is one of chlorine, bromine or iodine, and R' is a divalent hydrocarbon radical such as alkylene, cycloalkylene, arylene and the like having from 4 to 12 carbon atoms.

Examples of suitable halogen-substituted isocyanates include 4-chloro-1-butylisocyanate, 4-chlorocyclohexylisocyanate, 4-chlorophenylisocyanate, 5-bromo-1-naphthylisocyanate and 6-iodo-3-ethyl-2-naphthylisocyanate, all of the halogen-substituted isocyanates being prepared by methods known in the art, such as by contacting the corresponding halogen-substituted primary amine with phosgene.

The first reaction product is formed by reacting the metal salt of the lactam with the halogen-substituted isocyanate under a wide range of conditions. Best results are obtained when the reaction is conducted with the reactants in equimolar quantities in the presence of an inert hydrocarbon diluent such as benzene and cyclohexane at a temperature within the range of from about 20° to about 200°C for a period of from about 1 to about 60 minutes. However, a slight excess of the metal salt of the lactam can also be utilized. The first reaction product need not be recovered from the reaction mixture prior to reacting with the lithium-containing polymer.

The lithium-containing polymer which is reacted with the first reaction product is that known in the art as being produced, for example, by polymerizing a monomer with an organolithium compound having 1 to 4 lithium atoms per molecule, or by metalating a previously-prepared polymer with an organolithium compound. The lithium atom, or atoms, can be attached terminally, nonterminally, or both, to the polymer molecule.

The polymer, itself, can be the polymer of a conjugated diene having 4 to 12 carbon atoms per molecule or copolymers of conjugated dienes. As such the polymer can include copolymers, both random and block, of conjugated dienes and monovinyl-substituted aromatic compounds having from 8 to 20 carbon atoms per molecule and wherein the diene comprises at least 50 weight percent of the copolymer. Best results will be obtained when the polymer is elastomeric and is a copolymer of styrene and 1,3-butadiene with a lithium atom attached to one end of the polybutadiene segment and a polystyrene block attached to the other end of the polybutadiene segment.

The lithium containing polymer contains one or more groups

depending upon the method by which the polymer is formed. Monomers selected from the group consisting of conjugated dienes having from about 4 to about 12 carbon atoms per molecule and monovinyl-substituted hydrocarbon aromatic compounds having from about 8 to 12 carbon atoms per molecule can be employed. Suitable conjugated dienes include 1,3-butadiene, isoprene, piperylene, 6-phenyl-1,3-hexadiene, and the like. Suitable monovinyl-substituted aromatic hydrocarbon compounds include styrene, alpha-methylstyrene, 4-methylstyrene, 4-isopropylstyrene, 2,4-dimethylstyrene, 1-vinylnaphthalene, 2-vinylnaphthalene, alkyl derivatives thereof, and the like. The polymer can be a homopolymer of a conjugated diene or a monovinyl-substituted aromatic hydrocarbon compound or a random or block copolymer of two or more conjugated dienes or two or more monovinyl-substituted aromatic hydrocarbon compounds or a mixture of at least one conjugated diene and at least one monovinyl-substituted aromatic hydrocarbon compound.

These monomers can be polymerized using organolithium compounds as initiators. A preferred initiator is that which corresponds to the formula $R''Li_x$, wherein $R''$ is a hydrocarbon radical selected from the group consisting of aliphatic, cycloaliphatic, and aromatic radicals and combinations thereof, and x is an integer from 1 to 4, inclusive. The $R''$ in the formula has a valence equal to the integer x, and preferably contains from about 1 to 20 carbon atoms, although it is possible to use higher molecular weight compounds. It is preferred that the initiators be alkyl-lithium compounds. If n-alkyl-lithium compounds are employed it is desirable that a small amount of a polar compound such as tetrahydrofuran be employed in order to accelerate the rate of initiation. When forming the polymer in situ using an organoalkali metal initiator, the amount of initiator employed is generally in the range of from about 0.5 to about 20, preferably from about 1 to about 6, gram millimoles of initiator per 100 grams of monomers to be polymerized to form the base polymer. Examples of suitable polymerization initiators include methyllithium,
isopropyllithium,
n-butyllithium,
tert-octyllithium,
n-decyllithium,
phenyllithium,
1-naphthyllithium,
4-butylphenyllithium,
p-tolyllithium,
4-phenylbutyllithium,
cyclohexyllithium,
4-butylcyclohexyllithium,
4-cyclohexylbutyllithium,
dilithiomethane,
1,4-dilithiobutane,
1,8-dilithio-3-decene,
1,10-dilithiodecane,
1,20-dilithioeicosane,
1,4-dilithio-2-butene,
1,4-dilithiobenzene,
1,5-dilithionaphthalene,
1,2-dilithio-1,2-diphenylethane,
9,10-dilithio-9,10-dihydroanthracene,
1,2-dilithio-1,8-diphenyloctane,
1,3,5-trilithiopentane,
1,5-15-trilithioeicosane,
1,3,5-trilithiocyclohexane,
1,2,5-trilithionaphthalene,
1,3,5-trilithioanthracene,
1,3,5,8-tetralithiodecane,
1,5,10,20-tetralithioeicosane,
1,2,3,5-tetralithiocyclohexane,
1,2,3,5-tetralithio-4-hexylanthracene, dilithio adducts of 2,3-dialkyl-1,3-butadiene, preferably the dilithium adducts of 2,3-dimethyl-1,3-butadiene and dilithium adducts of butadiene and isoprene containing from 1 to 10 diene units per molecule, and the like. The polymerization procedures for the above monomers and initiators are well known and therefore will not be described here in detail, but suitable procedures can be found in British Pat. Nos. 817,693, and 888,624, and U.S. Pat. No. 2,975,160; their disclosures are hereby incorporated herein by reference.

Preformed polymers of various monomers including the conjugated dienes and monovinyl-substituted aromatic compounds disclosed hereinabove can be converted to a polymer containing the requisite $$-\overset{|}{\underset{|}{C}} - Li$$

groups by other procedures known in the art. For example, a hydrocarbon polymer (e.g., polybutadiene) containing either allylic or benzylic hydrogen atoms can be metallated with an alkyllithium compound (e.g., n-butyllithium) by reacting the polymer with the alkyllithium at a temperature in the range of 25°–200°C for from 2 minutes to 50 hours thereby providing a polymer having one or more intermediate $$-\overset{|}{\underset{|}{C}} - Li$$

groups per polymer molecule.

A suitable method for metallating a hydrocarbon polymer is disclosed in U.S. Pat. No. 3,492,369, which is herein incorporated by reference.

The lithium-containing polymer is reacted with the first reaction product discussed above in such quantities that the lithium equivalents in the lithium-containing polymer preferably are equal to the halogen equivalents in the first reaction product, although an excess of halogen equivalents can be employed. While the reaction can be conducted under a wide range of conditions to produce the second reaction product, best results are obtained when the reaction is conducted at a temperature within the range of from about 20° to about 200°C for a period of from about 1 to about 60 minutes. The second reaction product need not be recovered from the reaction mixture prior to reacting with the lactam to produce the diene-lactam block copolymer.

Suitable lactams for reaction with the second reaction product include such lactams as are suitable for the preparation of the previously-described metal salts of lactam. These lactams are reacted with the second reaction product in amounts within the range of from about 1 to about 99 parts of lactam per 100 parts by weight of the total weight of the lactam and the second reaction product. Best results are obtained within the range of from about 10 to about 40 parts by weight of lactam per 100 parts by weight of the total composition.

The lactam and second reaction product can be reacted over a wide range of conditions although best results will be obtained at a temperature within the range of 100° to 200°C, for a period of from about 0.25 to about 4 hours, at a pressure, preferably, which retains the reactants and diluents in a liquid state, an inert diluent such as cyclohexane being employed.

It is preferred that the lactam polymerization be carried out in the presence of an inert diluent. Suitable preferred diluents include alkanes, cycloalkanes and aromatic hydrocarbons. Other suitable diluents include the N,N-dihydrocarbyl-substituted amides of fatty acids, i.e., aliphatic carboxylic acids having about 6–30 carbon atoms per molecule. The particular inert diluent selected for the lactam polymerization should have a boiling point under normal conditions of at least 100°C.

The diene-lactam block copolymer can be recovered by procedures known in the art, these including precipitation, evaporation of the diluent, and the like. For example, the copolymers can be precipitated from the polymerization mixture wherein the polymer is present in the form of a solution, dispersion, or suspension in the diluent by the addition of a non-solvent for the polymer such as alcohols, e.g., methanol or 2-propanol, and the like. The polymers of this invention can in many instances also be recovered by evaporation, under reduced pressure if necessary, of the diluent and any unreacted monomer. These copolymers will have inherent viscosities within the range of about 0.25 to about 0.55 and will contain from about 0.75 to about 3.7 weight percent nitrogen.

This invention is illustrated by the following examples:

EXAMPLE I

Compound A, the sodium salt of 2-oxohexamethyleneimine, commonly called epsilon-caprolactam, was prepared by reacting 4 g of sodium hydride (50% by wt. in mineral oil) with 10 g of the lactam in a decalin solution. After hydrogen evolution ceased, the mixture was heated for 0.5 hour at 50°C. An alkalinity titration showed that the suspension of the sodium salt of the lactam in decalin had a concentration of 0.3 moles/liter.

Compound B in these runs was a toluene solution of 4-chlorophenyl isocyanate having a concentration of 0.74 moles/liter.

Reaction Component D, the polymer-lithium component, was prepared according to the polymerization recipe shown below.

Polymerization Recipe

| (Component D) | Parts, by weight |
|---|---|
| Cyclohexane | 315 |
| Styrene | 20 |
| sec-Butyllithium, mhm[(a)] | (6.7) |
| Temperature, °C | 70 |
| Time, minutes | 30 |
| 1,3-Butadiene | 40 |
| Temperature, °C | 70 |
| Time, minutes | 60 |

[(a)]mhm = gram millimoles per 100 g of butadiene and styrene monomers only.

As indicated in the recipe above the styrene was polymerized first followed by the butadiene. Component D then can be represented as (polystyrene)-(polybutadiene)-Li for the runs of this example.

Reaction Component C, the reaction product of Compounds A and B above, was prepared by charging 143 parts by weight of decalin to a reactor followed by 10 gram millimoles (per 100 g of lactam monomer to be added) each of Compounds A and B. The reaction was allowed to proceed for about 5 minutes at room temperature (about 26°C) after which the polymerization reaction mixture for Component D, i.e., cyclohexane solution of polymer-lithium prepared above, was added to the reactor. The reaction mixture was then heated to distill off the cyclohexane from the mixture.

In Run No. 1, after the temperature of the mixture reached 150°C (in about 50 minutes) a mixture of 40 parts by weight of the lactam, 2-oxohexamethyleneimine, commonly ε-caprolactam, and 107 parts by weight of decalin was added to the reaction mixture now containing the polymeric reaction Component E. The temperature of the reaction mixture was raised quickly (5 minutes) to 165°C and maintained at the level for 0.5 hour.

In Run No. 2, the cyclohexane was distilled off in about 35 minutes. The lactam-decalin mixture was added as the temperature reached 110°C rather than at 150°C as in Run No. 1. The temperature was again quickly raised to 165°C (5 minutes) and maintained at that level for 1 hour rather than 0.5 hour as in Run No. 1.

The reaction mixture from each run was cooled to 50°C and charged with 1 part by weight of an antioxidant, 2,2'methylene-bis(4-methyl-6-tert-butylphenol). Each reaction mixture was then coagulated with methanol and the liquids decanted from the solid polymer. The solid polymer from each run was then dried in air oven at about 60°C. The properties of the polymers are shown below in Table I.

TABLE I

| Run No. | Lactam Conv. %[(a)] | Inherent Viscosity [(b)] | Nitrogen Wt. %[(c)] | Cyclohexane Extractable, %[(d)] |
|---|---|---|---|---|
| 1 | 50 | 0.30 | 0.9 | 96 |
| 2 | 50 | 0.52 | 2.8 | 100 |

[(a)]Conversion based on recovered solid polymer.
[(b)]Determined according to the procedure of U.S. Pat. No. 3,278,508, col. 20, notes (a) and (b). Each polymer was gel free.
[(c)]Weight percent nitrogen calculated for a (polystyrene)-(polybutadiene)-(polylactam) (25/50/25) block copolymer is 3.1%.
[(d)]Amount of polymer extracted in refluxing cyclohexane in about 16 hours. The amount not extracted is believed to be the maximum amount of lactam homopolymer present in the solid recovered polymer.

The polymer from Run No. 1 was a brown rubbery solid somewhat sticky to the touch while the polymer from Run No. 2 was also a brown rubbery polymer but non-sticky to the touch.

EXAMPLE II

Two other runs were conducted employing the same type and amounts of Compounds A and B (Component C), the same Component D, and the same time and temperature employed for the reaction of Compounds A and B, and the same time and temperature for the lactam (2-oxohexamethyleneimine) polymerization step as employed in Run No. 2 of Example I. In the runs of this example, the amount of lactam in the polymerization step was 27 parts by weight rather than 40 parts by weight of lactam employed in Runs 1 and 2 of Example 1.

In Run 3 of this example, 143 parts by weight of decalin was added to the reaction mixture of Compounds A and B as in the previous runs and the cyclohexane distilled off as before. However, in Run 4 of this example, cyclohexane was replaced as the diluent in the styrene/butadiene polymerization by decalin and no decalin was then added to the reaction mixture of Compounds A and B.

The polymer products from Runs 3 and 4 were recovered from the lactam polymerization step in the same manner as in the previous runs except for an additional drying step under vacuum at 85°C. The results of Runs 3 and 4 are shown below in Table II. The polymers from Runs 3 and 4 were brown, soft rubbery solids.

TABLE II

| Run No. | Lactam Conv., % | Inherent Viscosity | Nitrogen, Wt. %[a] |
|---------|-----------------|--------------------|--------------------|
| 3       | 28              | 0.32               | 1.9                |
| 4       | 28              | 0.35               | 2.3                |

[a]The lactam conversion represents a (polystyrene)-(polybutadiene)-(polylactam) block copolymer of 30/61/9 weight ratio for which the calculated wt. % nitrogen is 1.2%.

EXAMPLE III

Two other runs were conducted in essentially the same manner and with the same reactants as used in Run 2 of Example I with the following exceptions. Instead of 143 parts by weight of decalin, these runs employed 107 parts by weight of decalin added to the reaction mixture of Compounds A and B. Both runs of this example employed a 1.5 hour reaction time for the lactam polymerization step rather than 1 hour. Run 6 (this example) employed a temperature of 180°C for the lactam polymerization step rather than 165°C of Runs 2 and 5 (of this example).

The polymers were recovered from Runs 5 and 6 in the same manner as that employed in Runs 3 and 4 of Example II.

The results from Runs 5 and 6 are presented in Table III below. The products of Runs 5 and 6 were brown, hard rubbery solids.

TABLE III

| Run No. | Lactam Conv., % | Inherent Viscosity | Nitrogen Wt. % | Cyclohexane Extractable, % |
|---------|-----------------|--------------------|----------------|----------------------------|
| 5       | 42              | 0.26               | 3.3[a]         | 78                         |
| 6       | 43              | 0.27               | 3.6[b]         | 95                         |

[a]The lactam conversion represents a (polystyrene)-(polybutadiene)-(polylactam) block copolymer of 25/53/22 weight ratio for which the calculated wt. % nitrogen is 2.8%.
[b]The lactam conversion represents a (polystyrene)-(polybutadiene)-(polylactam) block copolymer of 26/52/22 weight ratio for which the calculated wt. % nitrogen is 2.8%.

The results in Table III demonstrate that the higher reaction temperature in the lactam polymerization step did not increase lactam conversion significantly but did apparently decrease the amount of lactam homopolymer formed compared to Run 5. The results of Run 5 indicate that little lactam was present in the form of a block copolymer. The possibility exists that the indicated lactam conversion in Run No. 1 of Table I may be high because of incomplete removal of all of the decalin.

It will be evident that various modifications can be made to the method of this invention. However, such are considered to be within the scope thereof.

What is claimed is:

1. A method of producing a diene-lactam copolymer which comprises:

a. reacting a metal salt of a lactam with a halogen-substituted isocyanate to produce a first reaction product, said metal salt having the formula

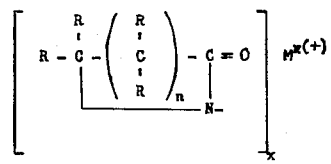

wherein R is selected from the group consisting of hydrogen, alkyl, cycloalkyl and aryl radicals or combinations thereof having from 1 to 10 carbon atoms and in which the total number of carbon atoms in such substituent groups is not greater than about 12; M is a metal selected from Group IA or IIA of the Periodic Table; and $x$ is an integer equal to the valence of M; and in which said halogen-substituted isocyanate has the general formula $X - R' - NCO$ wherein X is chlorine, bromine or iodine; and R' is a divalent hydrocarbon radical having from 4 to 12 carbon atoms; and $n$ is an integer having a value of 1, 2, 4, 5 and 6;

b. reacting said first reaction product with a lithium-containing polymer to produce a second reaction product, said lithium-containing polymer comprising a lithium-containing polymer of a conjugated diene having 4 to 12 carbon atoms, or a polymer of a conjugated diene and a vinyl-substituted aromatic compound having 8 to 20 carbon atoms; and c. reacting said second reaction product with a lactam monomer to produce a diene-lactam copolymer.

2. The method of claim 1 in which the quantity of said lithium-containing polymer reacted with said first reaction product is sufficient to provide an amount of lithium equivalents equal to the halogen equivalents in said first reaction product.

3. The method of claim 1 in which said lithium-containing polymer is a lithium-containing copolymer of styrene and 1,3-butadiene.

4. The method of claim 1 in which said metal salt of a lactam is an alkali metal salt and said metal salt of said lactam is reacted with said halogen-substituted isocyanate in equimolar quantities in the presence of an inert hydrocarbon at a temperature within the range of from about 20° to about 200°C for a period of about 1 to about 60 minutes.

5. The method of claim 1 in which said metal salt of a lactam is the sodium salt of 2-oxohexamethyleneimine, said halogen-substituted isocyanate is 4-chlorophenylisocyanate and said lithium-containing polymer is the reaction product of the copolymerization of styrene and 1,3-butadiene in the presence of a butyllithium initiator.

6. A diene-lactam copolymer produced in accordance with the method of claim 1.

7. A diene-lactam copolymer produced in accordance with the method of claim 5.

* * * * *

UNITED STATES PATENT AND TRADEMARK OFFICE
CERTIFICATE OF CORRECTION

PATENT NO. : 3,887,643
DATED : June 3, 1975
INVENTOR(S) : Charles M. Selman

It is certified that error appears in the above-identified patent and that said Letters Patent are hereby corrected as shown below:

Column 8, line 27, delete "5 and 6" and insert therefor -- 5 or 6 --.

Signed and Sealed this nineteenth Day of August 1975

[SEAL]

Attest:

RUTH C. MASON
Attesting Officer

C. MARSHALL DANN
Commissioner of Patents and Trademarks